Figure 1:
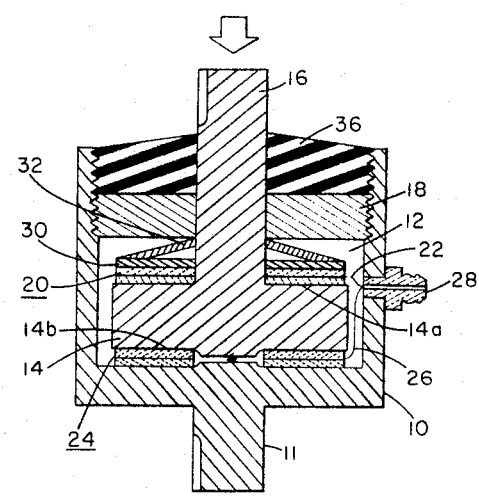

Aug. 30, 1966 C. F. SPROSTY 3,269,175
PIEZOELECTRIC FORCE MEASURING DEVICE
Filed March 16, 1964

*INVENTOR.*
CLARENCE F. SPROSTY
BY
ATTORNEY

United States Patent Office 3,269,175
Patented August 30, 1966

3,269,175
PIEZOELECTRIC FORCE MEASURING DEVICE
Clarence F. Sprosty, Parma, Ohio, assignor to Clevite
Corporation, a corporation of Ohio
Filed Mar. 16, 1964, Ser. No. 351,899
12 Claims. (Cl. 73—141)

This invention relates generally to an instrument for measuring force and more particularly to such a device employing piezoelectric elements to establish a voltage output which is directly proportionate to the force applied to the elements.

The measuring device here under consideration is particularly adapted to measure compliance and the Q factor of rubber and rubber-like articles. In the prior art it has been customary to use a test coil and/or strain gauge for testing rubber materials or the like. In these gauges a magnetically responsive member is caused to move within a magnetic field and the variation in the magnetic field of flux is amplified through a stable D.C. amplifier and registered to indicate the characteristics which are to be measured.

The disadvantages inherent in the devices of the prior art are manifold. They can, however, be summarized in that their weight contributes to a considerable problem as well as limits the degree of accuracy of measurement. The frequency of operation of the prior art devices is also rather limited. Most known devices of the prior art are restricted to a particular frequency range and environment. Tests beyond this range cause the device to operate at a resonant frequency and the test results become interrupted and distorted. It is therefore common practice to have a plurality of test gauges available so as to cover a broad range of frequencies. An illustrative and very common range is from 80 to 100 c.p.s.

One further disadvantage inherent in the prior art devices, resides in the fact that the signals, as developed by a fluctuation in the magnetic field, are very weak and amplification means must be employed. A conventional pick-up coil may generate 1/10 of a millivolt for each pound of force applied to it.

The device constructed in accordance with this invention avoids and overcomes these various shortcomings and disadvantages by providing a piezoelectrically actuated device which has a very high force per voltage output ratio such as ½ volt for each pound of force, and in which the voltage output is directly proportionate to the force applied to it. Its resonance frequency is extremely high and tests have shown that the device does not go into resonance during a frequency range from about 0 to 1,000 c.p.s. The actual limits thereof have not been established. Inasmuch as piezoelectric elements are highly efficient mechanical to electrical energy transducers, the electrical output thus produced is of a very high magnitude. The subject device is also uniquely adapted to measure the Q factor of resilient materials, that is the ability of, for example, a rubber article, to bounce back to its original state upon being squeezed or compressed by the testing device. The Q is measured by the output voltage which is directly proportionate to the force required to squeeze the rubber to some predetermined degree.

An aspect of the present invention resides in the provision of a piezoelectric force measuring device which is particularly adapted for testing rubber articles, or articles of like materials. This device is comprised of a housing member and a stud member which is displaceable relative to and within this housing member along a predetermined axis. One of the members is constructed to provide a driver for contact with the test article. The device also includes a first pair of piezoelectric elements responsive in compression and poled in a direction parallel to the first axis, these elements are disposed between one end of the stud member and one end of the housing; and a second pair of piezoelectric elements responsive in compression and also poled in a direction parallel to the aforesaid axis, the elements being disposed between the opposite end of the stud member and the housing. A pre-tension member is suitably disposed within the housing to insure a static load on the piezoelectric elements which is greater than that force for which the device is designed to be used.

It is therefore the primary object of this invention to provide a piezoelectric force measuring device which substantially eliminates or overcomes the problems and disadvantages encountered in the prior art.

It is a further object of this invention to provide an improved force measuring instrument in which piezoelectric elements are utilized to provide an output voltage which is directly proportionate to the force applied and the release thereof.

It is another object of this invention to provide a piezoelectric force measuring device having an extremely broad range of operating frequencies.

It is a still further object of this invention to provide a piezoelectric force measuring device in which the compliance and Q factor of soft, for instance rubber-like articles, can be tested more accurately than was heretofore possible.

For a better understanding of the present invention, together with other and further objects thereof, reference is had to the following description taken in connection with the accompanying drawings, and its scope will be pointed out in the appended claims.

Figure 2:
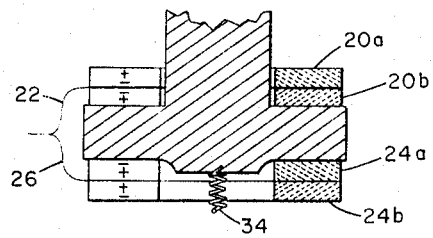

FIGURE 1 is a vertical cross section of a force measuring device in accordance with this invention; and FIGURE 2 is an enlarged view similar to FIGURE 1 illustrating a sectional fragment of the stud member carrying annular piezoelectric elements.

Referring now to the drawing, there is shown a housing 10 providing at one axial end thereof a driver 11 in the form of a centrally located cylindrical stud or extension, suitable for rigid mounting or engagement with a test article. The opposite end of the housing 10 is provided with an access opening to space 12 which is adapted to receive therein a mounting and/or driving stud member 14 having at one axial end a stem-like extension 16 which serves, alternatively, the same function as the driving element 11 of the housing. The stud 14 is formed with a radially enlarged portion spaced from the housing 10 to facilitate axial displacement of the stud along the central axis of the housing. For simplicity, one axial end of the stud member will be referred to as the bottom portion 14b and the opposite end thereof as the top portion 14a.

A radially threaded end cover and adjustable pre-tension plate 18 is suitably seated in the access opening of space 12 and has an axially extending opening through which the stem 16 of stud 14 protrudes. The housing 10 as well as the stud member 14 and the end cover member 18 are all, preferably, constructed of stainless steel.

Mounted between the top part 14a of the stud member and the cover member 18 is a pair of piezoelectric elements 20. Each piezoelectric element, 20a and 20b, is formed as an annular disc mounted about stem 16 and secured against the radial enlargement of the stud member 14a. Each of said elements is poled in a direction which is parallel to the central axis of the drivers 11 and 16 and thus is piezoelectrically responsive to compression and the release thereof. The elements are arranged face to face, secured together with conductive cement and electroded at the interface thereof to provide an electrical contact terminal with a lead connection 22. The piezoelectric elements constituting pair 20 are mechanically and electrically in parallel and provide a positive voltage output when pressure is applied thereto in an axial direction and a negative voltage when the pressure is released.

A second pair of piezoelectric elements 24, consisting of individual element 24a and 24b are arranged at the opposite end of the stud member 14, i.e., between the lower end 14b thereof and the housing member. The pair of elements 24 are in all respects identical to the first pair of elements 20 except as noted. The elements 24a and 24b are polarized and electroded in such a manner so as to generate a voltage potential having the opposite polarity of the potential generated by the pair of elements 20. In the case as described herein, the elements 24a and 24b provide, when suitable pressure or force is applied thereto, a voltage output having a negative polarity and when the force or pressure is released the elements generate a voltage potential of a positive polarity. While the determination for locating either pair of piezoelectric elements is not critical, however, in the preferred embodiment it is such that a positive force causing stud 16 and housing 10 to be brought together will induce a positive voltage. The sole requirement to be observed is that the voltage output of one pair for a single mode of application, i.e., compression or the release thereof, is inverse to the other. A lead 26 is electrically coupled to the electrode at the interface of elements 24a and 24b (not visible as such) and extends together, in electrical contact, through a hermetically sealed glass bead 28 and at the outer opening thereof these leads are coupled to an electric cable of a voltage indicator instrument not shown.

By reasons of this contact between the leads 22 and 26 it will be appreciated that the pairs of piezoelectric elements 20 and 24, while mechanically in series, are connected electrically in parallel.

In the force measuring device of this invention, use is made of a piezoelectric response in the compression mode to produce an electrical output in direct proportion to the force applied thereto. It is well known to those skilled in the art that the sensitivity of the elements may be increased or decreased by varying the cross sectional area and thickness thereof. The piezoelectric ceramics used for such purposes are, for example, barium titanate, lead titanate, lead zirconate, and the like. Natural crystals are normally not suitable due to their lack of strength.

In order to provide a voltage output of the type heretofore described, a brass washer 30 is mounted about the extension 16 of the stud 14 and abuts element 20a to suitably distribute a force which is applied to these elements by a spring washer 32 interposed between the brass washer 30 and the end cover 18. The spring washer 32 places the elements under pressure of a predetermined value for reasons which will hereinafter become more apparent.

To facilitate a proper grounding of the casing, as well as the stud member, a conducting means such as a very low compression contact spring 34 is interposed between the stud and the housing member. The sensitivity of the device is maintained by excluding humidity and other detrimental ambient factors out of the space 12. For this purpose, a silicon rubber seal 36 is applied to the face of the end cover 18 and surrounds the extension 16. The material forming the seal 36 should preferably be sufficiently elastic so as to have little bearing on the displaceability of the stud member 14 relative to the housing 10.

In operation the driver extension 11 of the housing 10 or the extension 16 of the stud member 14 is directly or indirectly brought into engagement with the article to be tested. The driver which is not used is held stationary or is connected to a device which facilitates the movement of this measuring instrument. For purposes of illustration let it be assumed that the extension 16 is used as the driving stud. The stud is inserted in an arm or lever of a driving mechanism or installed with the housing in a fixed position and the force to be measured is applied to the movable stud. Thus, for instance, when a force is applied in the direction of the arrow as shown, by virtue of the contact with the material to be tested, the pair of elements 24 are squeezed against the housing 10 and generate a piezoelectric potential in the form of voltage having a positive polarity while the pair of elements 20 is simultaneously released of the pre-tension applied to it by spring washer 32 and therefore generates a voltage of the same magnitude and polarity. Conversely when the force upon the stud member 14 is released so that the elements 24a and 24b can again expand to their original and normal position, a voltage of negative polarity is generated thereby and, simultaneously, the elements of pair 20 are again compressed by virtue of the decrease in the space between the elements and the cover member 18 thus increasing the compressive force of the pre-tension spring washer 32 whereby a voltage of negative polarity is generated. The pre-tension force can, of course, be varied by changing the relative position of cover 18.

It is obvious that the polarity generated by each pair of piezoelectric elements is not limited to the arrangement as shown but can quite obviously be the reverse thereof as noted above.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A piezoelectric force measuring device for testing a rubber article or the like, comprising, in combination: a housing member; a stud member displaceable relative to and within said housing member along a predetermined axis, one of said members including driving means adapted for engaging the test article; a first pair of piezoelectric elements responsive in compression and poled in a direction parallel to said axis, said elements being disposed between one end of the stud and the housing; a second pair of piezoelectric elements electrically connected in parallel with said first pair and responsive in compression and poled in a direction parallel to said axis, said elements being disposed between the opposite end of said stud and said housing, whereby upon relative axial movement between said members one of said pairs of elements is under compression and the other is comparatively relaxed; and pre-tension means interposed between said elements and said housing member.

2. A piezoelectric force measuring device according to claim 1, wherein said first pair of piezoelectric elements comprises two elements arranged face to face and electroded at the interface thereof to provide a positive voltage upon compression of said elements and a negative voltage upon the release of said compression; and wherein said second pair of piezoelectric elements comprises two elements arranged face to face and electroded at the interface thereof to provide a negative voltage upon compression of said elements and a positive voltage upon the release of said compression.

3. A piezoelectric force measuring device according to claim 2, wherein said elements of a single pair are mechanically and electrically in parallel, and the elements of said first and second pair are mechanically in series but electrically in parallel.

4. A piezoelectric force measuring device according to claim 3, wherein said pairs of elements generate a potential of a single polarity upon the compression of one of said pairs and another potential of opposite polarity when said compression is released.

5. A piezoelectric force measuring device comprising, in combination: a hollow longitudinally extending housing; a driving stud extending into said housing parallel to the longitudinal axis thereof, said stud having an enlarged portion within the housing projecting radially from said axis and axially spaced from the ends of the housing member; a plurality of pairs of piezoelectric elements responsive in compression and poled in a direction parallel to the said longitudinal axis, at least one pair of said elements being interposed between one axial end of the housing and said enlarged portion of said stud, and at least another pair of said elements being interposed between the other end of said housing and said enlarged portion; and pre-tension means interposed between one of said pairs of elements and said housing and effective to pre-load said latter pair.

6. A device according to claim 5, wherein all of said elements are relatively thin annular rings having a capacity to generate at least $4/10$ volt for each pound of force applied to it.

7. A device according to claim 6, wherein the range of frequency for operating the device is substantially from 0 to at least 1,000 c.p.s.

8. A piezoelectric force measuring device comprising, in combination: a hollow longitudinally extending housing; a stud member extending into said housing parallel to the longitudinal axis thereof, said stud having an enlarged portion within the housing projecting radially from said axis and axially spaced from the ends of the housing member; a plurality of pairs of piezoelectric elements responsive in compression and poled in a direction parallel to the said longitudinal axis, one of said pairs including two piezoelectric elements arranged face to face and interposed between one axial end of the housing and one end of said enlarged portion, said elements being polarized and electroded at the interface thereof to provide a positive voltage upon compression of said elements and a negative voltage upon the release of the compression; and at least another pair comprising two of said elements arranged face to face and interposed between the other axial end of the housing and the enlarged portion, the last mentioned elements being polarized and electroded at the interface thereof to provide a negative voltage upon compression of said elements and a positive voltage upon the release of the compression; and pre-tension means interposed between one pair of elements and said housing and effective to pre-load said elements.

9. A device according to claim 8, wherein the pretension means is adjustable and includes a washer spring interposed between the housing and one pair of elements.

10. A device according to claim 8, wherein said housing provides an outwardly projecting stud coaxially arranged with respect to said stud.

11. A piezoelectric force transducer comprising, in combination: a hollow longitudinally extending housing having at one axial end an access opening, an end cover detachably disposed in the opening; a stud member extending movably through said cover into said housing parallel to the longitudinal axis thereof, said stud having an enlarged portion within the housing projecting radially from said axis and axially spaced from the ends of the housing member; a rubber-like seal covering the cover, parts of the housing and surrounding portions of the stud proximate to the cover; a plurality of at least four piezoelectric elements responsive in compression and poled in a direction parallel to the said longitudinal axis, at least two of said elements arranged face to face and interposed between one axial end of the housing and one end of said enlarged portion, said last mentioned elements being polarized and electroded at the interface thereof to provide a positive voltage upon compression of said elements and negative voltage upon the release of the compression; and at least another two of said elements arranged face to face and interposed between the other axial end of the housing and the enlarged portion, the last mentioned elements being polarized and electroded at the interface thereof to provide a negative voltage upon compression of said elements and a positive voltage upon the release of the compression; and pre-tension means interposed between said housing and a pair of said elements for acting upon all active elements to pre-load said elements.

12. A piezoelectric force measuring device according to claim 1, wherein said driving means is integral with said housing member.

References Cited by the Examiner
UNITED STATES PATENTS

| | | | |
|---|---|---|---|
| 1,528,627 | 3/1925 | Peters | 73—141 X |
| 2,371,626 | 3/1945 | Kecskemeti | 310—8.4 X |
| 2,564,416 | 8/1951 | Wildhack | 73—88.5 X |

FOREIGN PATENTS 403,098   12/1933   Great Britain.

OTHER REFERENCES

Ziembinski: "New Impact Tester Checks Metal Fatigue," Industrial Laboratories, May 1959, Pages 62–71.

RICHARD C. QUEISSER, *Primary Examiner.*

C. A. RUEHL, *Assistant Examiner.*